United States Patent
Hashimoto et al.

(10) Patent No.: US 9,333,428 B2
(45) Date of Patent: *May 10, 2016

(54) SERVER DEVICE, AND NON-TRANSITORY COMPUTER-READABLE STORAGE MEDIUM STORING GAME PROGRAM

(71) Applicant: DeNA Co., Ltd., Tokyo (JP)

(72) Inventors: Shun Hashimoto, Tokyo (JP); Yuji Ukai, Tokyo (JP); Naoto Yoshie, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 14/219,909

(22) Filed: Mar. 19, 2014

(65) Prior Publication Data

US 2014/0206453 A1    Jul. 24, 2014

Related U.S. Application Data

(63) Continuation of application No. 14/063,268, filed on Oct. 25, 2013, now Pat. No. 8,715,091.

(30) Foreign Application Priority Data

Oct. 29, 2012  (JP) .................................. 2012-238208

(51) Int. Cl.
| | |
|---|---|
| *A63F 9/00* | (2006.01) |
| *A63F 13/30* | (2014.01) |
| *A63F 13/69* | (2014.01) |

(52) U.S. Cl.
CPC .................. *A63F 13/12* (2013.01); *A63F 13/69* (2014.09); *A63F 2300/575* (2013.01)

(58) Field of Classification Search
None
See application file for complete search history.

(56) References Cited

U.S. PATENT DOCUMENTS

| | | | |
|---|---|---|---|
| 7,233,916 B2 * | 6/2007 | Schultz | .............. G06Q 30/0609 340/309.16 |
| 7,966,239 B2 | 6/2011 | Van Luchene | |
| | | (Continued) | |

FOREIGN PATENT DOCUMENTS

JP    2006-094877    4/2006

OTHER PUBLICATIONS

Sterling, Jim. "Review: Blacklight: Retribution". Apr. 18, 2012. <http://www.destructoid.com/review-blacklight-retribution-226017.phtml>.*

(Continued)

*Primary Examiner* — Seng H Lim
(74) *Attorney, Agent, or Firm* — Procopio, Cory, Hargreaves & Savitch LLP

(57) ABSTRACT

A server device connected with a player terminal used by a player when performing a game operation over a network includes: a rental unit; a providing unit; a storage unit configured to store player information in which the rental game content rented from the rental unit is set as game content temporarily possessed by the player, and the game content provided by the providing unit is set as game content possessed by the player; a parameter varying unit; a game content determination unit; a parameter setting unit configured to set a parameter of the game content based on a parameter of the rental game content varied by the parameter varying unit; a condition determination unit configured to determine whether a return condition of the rental game content is satisfied; and an update unit configured to update the player information stored in the storage unit.

3 Claims, 19 Drawing Sheets

(56) References Cited

U.S. PATENT DOCUMENTS

| | | | |
|---|---|---|---|
| 8,192,286 B2 * | 6/2012 | Dhunjishaw | G06Q 10/06 463/40 |
| 8,376,860 B1 | 2/2013 | Boutin | |
| 8,454,442 B2 | 6/2013 | Van Luchene | |
| 8,469,821 B2 | 6/2013 | Van Luchene | |
| 2003/0045346 A1 * | 3/2003 | Watanabe | G07F 17/32 463/20 |
| 2004/0163133 A1 * | 8/2004 | Ueda | A63F 13/10 725/133 |
| 2006/0068916 A1 * | 3/2006 | Hiranoya | G07F 17/3211 463/42 |
| 2006/0080702 A1 | 4/2006 | Diez et al. | |
| 2008/0234038 A1 | 9/2008 | Jiao et al. | |
| 2008/0293466 A1 * | 11/2008 | Arakawa | A63F 13/10 463/7 |
| 2009/0170585 A1 * | 7/2009 | Yang | A63F 13/02 463/16 |
| 2010/0185531 A1 | 7/2010 | Van Luchene | |
| 2012/0244945 A1 * | 9/2012 | Kolo | A63F 13/12 463/42 |
| 2012/0283011 A1 | 11/2012 | Van Luchene | |
| 2012/0283014 A1 | 11/2012 | Van Luchene | |
| 2013/0029767 A1 | 1/2013 | Boutin | |
| 2013/0079156 A1 | 3/2013 | Koyama et al. | |
| 2013/0165222 A1 | 6/2013 | Wysocki | |

OTHER PUBLICATIONS

Japanese Patent Application No. 2012-238208; Office Action mailed on May 14, 2013.

"Lost Saga",Oct. 7, 2011,Game Watch, ImpressWatch Corporation, http://game.watch.impress.co.jp/docs/review/20111007_482420.html.

"Daisodatsu (Great Struggle)!!! Legend Card", "Famitsu mobage No. 2, Weekly Famitsu, Aug. 25 Extra Edition", Enterbrain, Inc., Jul. 21, 2011, pp. 58-59.

"Tales of Kizna", "Dengeki Game App, vol. 5, ASCII.PC,Oct. 2012 Extra Edition", ASCII Media Works Inc., the 15th issue, the 15th volume, Aug. 18, 2012, p. 22.

Japanese Patent Application No. 2012-238208; Office Action mailed on Jan. 15, 2013.

* cited by examiner

FIG. 4

| CARD ID | CHARACTER NAME | CHARACTER IMAGE | RARITY | INITIAL (Lv. 1) ATTACK POWER | INITIAL (Lv. 1) DEFENSE POWER |
|---|---|---|---|---|---|
| 0001 | SOLDIER A | | COMMON | 15 | 8 |
| 0002 | SOLDIER A | | UNCOMMON | 20 | 15 |
| 0003 | SOLDIER A | | RARE | 100 | 60 |
| 0004 | SOLDIER A | | SUPER RARE | 200 | 180 |
| 0011 | SOLDIER B | | COMMON | 10 | 5 |
| 0012 | SOLDIER B | | UNCOMMON | 15 | 10 |
| 0013 | SOLDIER B | | RARE | 80 | 50 |
| ... | ... | ... | ... | ... | ... |
| 2591 | WIZARD Z | | COMMON | 20 | 30 |
| 2592 | WIZARD Z | | UNCOMMON | 50 | 75 |
| 2593 | WIZARD Z | | RARE | 60 | 100 |
| 2594 | WIZARD Z | | SUPER RARE | 150 | 300 |

FIG. 5

| PLAYER ID | FRIEND PLAYER ID | PLAY POINT | POSSESSED CARD INFORMATION | RENTAL CARD INFORMATION | DECK INFORMATION |
|---|---|---|---|---|---|
| 1 | 5, 8 | 15000 | POSSESSED CARD INFORMATION (1) | RENTAL CARD INFORMATION (1) | DECK INFORMATION (1) |
| 2 | NONE | 6000 | POSSESSED CARD INFORMATION (2) | RENTAL CARD INFORMATION (2) | DECK INFORMATION (2) |
| 3 | 4, 6 | 50000 | POSSESSED CARD INFORMATION (3) | RENTAL CARD INFORMATION (3) | DECK INFORMATION (3) |
| 4 | 3, 6 | 90000 | POSSESSED CARD INFORMATION (4) | RENTAL CARD INFORMATION (4) | DECK INFORMATION (4) |
| 5 | 1, 6 | 40000 | POSSESSED CARD INFORMATION (5) | RENTAL CARD INFORMATION (5) | DECK INFORMATION (5) |
| 6 | 3, 4, 5 | 30000 | POSSESSED CARD INFORMATION (6) | RENTAL CARD INFORMATION (6) | DECK INFORMATION (6) |
| . | . | . | . | . | . |
| . | . | . | . | . | . |
| . | . | . | . | . | . |

FIG. 6

| POSSESSED CARD INFORMATION (1) | | | | | |
|---|---|---|---|---|---|
| POSSESSED CARD ID | LEVEL | ATTACK POWER | DEFENSE POWER | ACQUIRED DATE AND TIME | TIME |
| 0011 | LV.3 | 15 | 10 | 2012/2/13 10:00 | 0:00 |
| 0211 | LV.4 | 20 | 23 | 2012/2/13 12:00 | 2:00 |
| 0133 | LV.1 | 70 | 45 | 2012/2/14 11:30 | 1:30 |
| 0201 | LV.4 | 22 | 40 | 2012/2/15 18:00 | 8:00 |
| 0072 | LV.7 | 60 | 50 | 2012/2/16 13:30 | 3:30 |
| 0094 | LV.1 | 300 | 200 | 2012/2/16 19:00 | 9:00 |
| . | . | . | . | . | |
| . | . | . | . | . | |
| . | . | . | . | . | |

FIG. 7

RENTAL CARD INFORMATION (1)

| RENTAL CARD ID | LEVEL | ATTACK POWER | DEFENSE POWER | RENTED DATE AND TIME | RETURN TIME |
|---|---|---|---|---|---|
| 0514 | LV.20 | 65 | 60 | 2012/2/12 8:00 | 8:00 |
| 0024 | LV.10 | 70 | 73 | 2012/2/12 10:00 | 0:00 |
| 0234 | LV.15 | 120 | 95 | 2012/2/13 9:30 | 9:30 |
| ... | ... | ... | ... | | |
| ... | ... | ... | ... | | |
| ... | ... | ... | ... | | |

RENTAL CARD INFORMATION (2)

RENTAL CARD INFORMATION (3)

SERVER DEVICE, AND NON-TRANSITORY COMPUTER-READABLE STORAGE MEDIUM STORING GAME PROGRAM

CROSS-REFERENCE TO RELATED APPLICATIONS

This application claims the foreign priority benefit under 35 USC 119 of Japanese Patent Application No. 2012-238208, filed Oct. 29, 2012, as well as domestic benefit under 35 USC 120 of U.S. patent application Ser. No. 14/063,268, filed Oct. 25, 2013, the disclosures of which are hereby incorporated by reference in their entirety.

BACKGROUND OF THE INVENTION

1. Field of the Invention

The present invention relates to a server device and a game program.

2. Description of Related Art

A game system capable of renting game content such as items to players has been known (for example, Japanese Patent Application Laid-Open No. 2006-94877).

SUMMARY OF THE INVENTION

In such a game system, the player can temporarily own the rented game content (hereinafter, also referred to as rental game content). However, the player needs to return the rental game content due to the elapse of the rental period. Therefore, the player needs to take account of the return of the rental game content later while playing a game using the rental game content. Therefore, there is a concern of lowering the motivation of actively using the rental game content.

The present invention has been made in view of the foregoing, and an objective is to allow the player to actively use the rental game content.

A principal invention of the present invention to solve the above-described problems is a server device connected with a player terminal used by a player when performing a game operation over a network, including: a rental unit configured to rent rental game content set for rental to the player; a providing unit configured to provide game content to the player; a storage unit configured to store player information in which the rental game content rented from the rental unit is set as game content temporarily possessed by the player, and the game content provided by the providing unit is set as game content possessed by the player; a parameter varying unit configured to vary at least a parameter set to the rental game content, based on a request from the player terminal; a game content determination unit configured to determine whether the game content and the rental game content temporarily possessed by the player have a predetermined relationship when the providing unit provides the player with the game content; a parameter setting unit configured to set a parameter of the game content based on a parameter of the rental game content varied by the parameter varying unit when the game content determination unit determines there is the predetermined relationship; a condition determination unit configured to determine whether a return condition of the rental game content rented from the rental unit is satisfied; and an update unit configured to update the player information stored in the storage unit so that the rental game content becomes game content not possessed by the player when the condition determination unit determines that the return condition is satisfied.

Other characteristics of the present invention will become clear from the description of the present specification and the appended drawings.

The present invention enables the player to actively use rental game content.

BRIEF DESCRIPTION OF THE DRAWINGS

FIG. 4 is a diagram illustrating an example of a data structure of card information;

FIG. 5 is a diagram illustrating an example of a data structure of player information;

FIG. 6 is a diagram illustrating an example of a data structure of possessed card information;

FIG. 7 is a diagram illustrating an example of a data structure of rental card information;

DETAILED DESCRIPTION OF THE INVENTION

Figure 1:
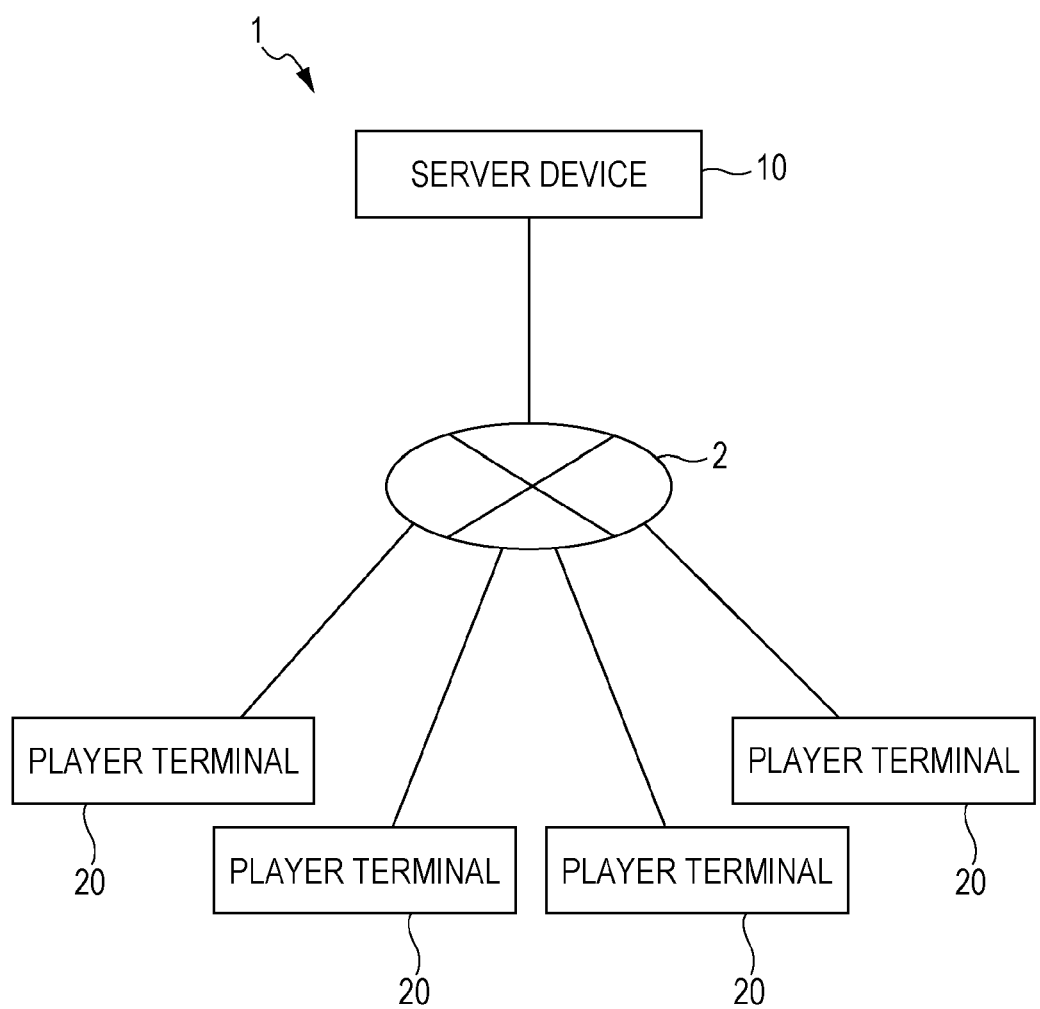
FIG. 1 is a diagram illustrating an overall configuration example of a game system.

At least the following matters will become clear according to the description of the present specification and the appended drawings.

A server device connected with a player terminal used by a player when performing a game operation over a network, including: a rental unit configured to rent rental game content set for rental to the player; a providing unit configured to provide game content to the player; a storage unit configured to store player information in which the rental game content rented from the rental unit is set as game content temporarily possessed by the player, and the game content provided by the providing unit is set as game content possessed by the player; a parameter varying unit configured to vary at least a parameter set to the rental game content, based on a request from the player terminal; a game content determination unit configured to determine whether the game content and the rental game content temporarily possessed by the player have a predetermined relationship when the providing unit provides the player with the game content; a parameter setting unit configured to set a parameter of the game content based on a parameter of the rental game content varied by the parameter varying unit when the game content determination unit determines there is the predetermined relationship; a condition determination unit configured to determine whether a return condition of the rental game content rented from the rental unit is satisfied; and an update unit configured to update the player information stored in the storage unit so that the rental game content becomes game content not possessed by the player when the condition determination unit determines that the return condition is satisfied.

According to such a server device, the rental game content can be actively utilized by the player.

Further, in the server device, the parameter varying unit varies the respective parameters set to the rental game content rented from the rental unit and set to the game content provided by the providing unit, and may significantly vary the parameter of the rental game content compared with the parameter of the game content when varying the parameter of the rental game content.

According to such a server device, the rental game content can be further actively utilized by the player.

Further, in the server device, the return condition may be a fact that a predetermined period has elapsed from when the rental game content is rented from the rental unit to the player.

According to such a server device, the rental game content can be actively utilized by the player within a limited period.

Further, in the server device, the return condition may further include a fact that game content having the predetermined relationship with the rental game content temporarily possessed by the player is provided to the player by the providing unit.

According to such a server device, the player does not need to temporarily own the rental game content, and can own only game content having a predetermined relationship with the rental game content.

Further, in the server device, when the condition determination unit determines the return condition is satisfied, the parameter varying unit may apply fusion to the rental game content temporarily possessed by the player and any of the game content possessed by the player to vary the parameter set to the game content after the fusion based on the parameter of the rental game content.

According to such a server device, a parameter set to the game content owned by the player varies based on a parameter of the rental game content. Therefore, the rental game content can be further actively utilized.

Further, in the server device, when the condition determination unit determines the return condition is satisfied, the parameter varying unit may apply fusion to the rental game content temporarily possessed by the player and game content having the predetermined relationship to significantly vary the parameter set to the game content after the fusion compared with a case where applying fusion to game content not having the predetermined relationship with the rental game content.

According to such a server device, the parameter set to the game content having a predetermined relationship with the rental game content significantly varies based on the parameter of the rental game content. Therefore, the rental game content can be further actively utilized.

EMBODIMENTS

Configuration of Game System 1

FIG. 1 is a diagram illustrating an example of an overall configuration of a game system 1 according to the present embodiment. The game system 1 provides a player with various services related to games through a network 2 (for example, the Internet and the like), and includes a server device 10 and a plurality of player terminals 20.

Configuration of Server Device 10

Figure 2:
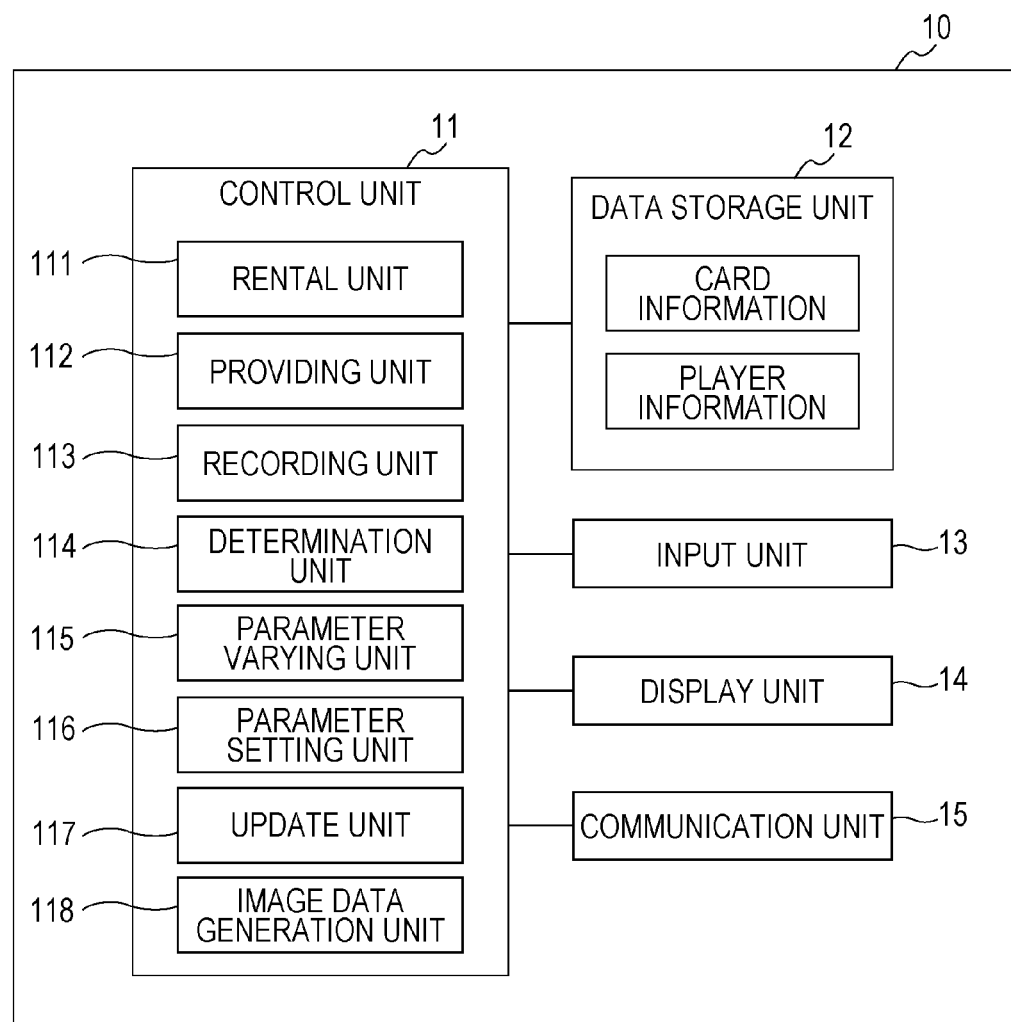
FIG. 2 is a block diagram illustrating a functional configuration of a server device.

FIG. 2 is a block diagram illustrating a functional configuration of the server device 10 according to the present embodiment. The server device 10 is an information processing apparatus (for example, a workstation, a personal computer, and the like) used when a system administrator and the like manage the game service. The server device 10 can distribute a game program operable on the player terminal 20, a web page made in a markup language (HTML, and the like), and the like according to a specification of the player terminal 20 upon receiving various commands (requests) from the player terminal 20. The server device 10 includes a control unit 11, a data storage unit 12, an input unit 13, a display unit 14, and a communication unit 15.

The control unit 11 performs data passing among units as well as controlling the whole server device 10, and is realized by a central processing unit (CPU) executing a program stored in a predetermined memory. The control unit 11 of the present embodiment includes a rental unit 111, a providing unit 112, a recording unit 113, a determination unit 114, a parameter varying unit 115, a parameter setting unit 116, an update unit 117, and an image data generation unit 118.

The rental unit 111 has a function to execute processing of renting game content set for rental purpose (hereinafter, referred to as rental game content) to the player. Examples of the game content include a game card and a figure associated with a character and an item such as a tool and an ability.

The providing unit 112 includes a function to execute processing of providing the player with the game content to be used in a battle game described below.

The recording unit 113 is connected to the data storage unit 12 through a bus and includes a function to execute processing of recording data in the data storage unit 12 in response to a command from the control unit 11.

The determination unit 114 includes a function to execute various types of determination processing that includes determining whether the rental game content rented from the rental unit 111 and game content provided by the providing unit 112 have a predetermined relationship, and processing of determining whether a return condition for returning the rental game content rented from the rental unit 111.

The parameter varying unit 115 includes a function to execute processing of varying a parameter at least set to the rental game content based on a request from the player terminal 20. The parameter varying unit 115 in the present embodiment can vary parameters respectively set to the rental game content provided from the rental unit 111 and the game content provided by the providing unit 112.

The parameter setting unit 116 includes, when the determination unit 114 determines that the rental game content rented from the rental unit 111 and the game content provided by the providing unit 112 have the predetermined relationship, a function to execute processing of setting a parameter of the game content having the predetermined relationship based on the parameter of the rental game content that has varied by the parameter varying unit 115.

The update unit 117 is connected to the data storage unit 12 through a bus and includes a function to execute processing of updating data stored in the data storage unit 12 based on a command from the control unit 11.

The image data generation unit 118 includes a function to execute processing of generating image data for displaying, in the player terminal 20, an operation screen that prompts the player to play a game, and a game screen.

The data storage unit 12 includes a read only memory (ROM) that is a read only storage area in which a system program is stored, and a random access memory (RAM) that is a rewritable storage area used as a work area for arithmetic processing by the control unit 11. The data storage unit 12 is, for example, realized by a non-volatile storage device, such as a flash memory or a hard disk. The data storage unit 12 of the present embodiment stores card information that is information related to game cards as an example of game content and player information that is information related to a player. Note that each of the information will be described in detail.

The input unit 13 is used for inputting various data (for example, the card information and the like) by the system administrator, and the like, and is realized by, for example, a keyboard, a mouse, and the like.

The display unit 14 is used for displaying an operation screen for the system administrator based on a command from the control unit 11, and is, for example, realized by a liquid crystal display (LCD) and the like.

The communication unit 15 is used for performing communication with the player terminal 20, and has a function as a reception unit that receives various data and signals transmitted from the player terminal 20, and a function as a transmission unit that transmits various data and signals to the player terminal 20 according to a command of the control unit 11. The communication unit 15 is, for example, realized by a network interface card (NIC), and the like.

Configuration of Player Terminal 20

Figure 3:
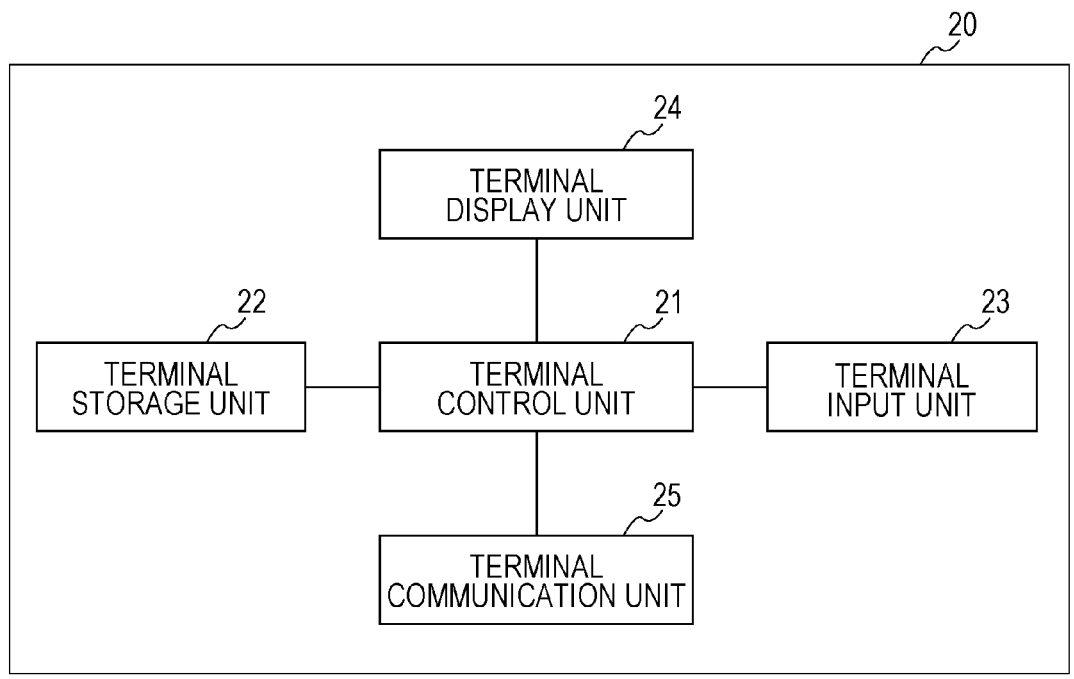
FIG. 3 is a block diagram illustrating a functional configuration of a player terminal.

FIG. 3 is a block diagram illustrating a functional configuration of the player terminal 20. The player terminal 20 of the present embodiment is an information processing apparatus (for example, a mobile phone terminal, a smart phone, and the like) used by the player when a game is played, and can request distribution of various types of information (a game program, a web page, and the like) related to the game to the server device 10. Since the player terminal 20 has a web browser function for allowing the player to browse a web page, the web page (a game play image, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the whole player terminal 20, and is realized by the central processing unit (CPU) executing a program stored in a predetermined memory. The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, and the like. The terminal input unit 23 is used for performing various operations (a game operation, and the like) by the player, and is realized, for example, by an operation button, a touch panel, and the like. The terminal display unit 24 is used for displaying a game screen (a game image, an operation image, and the like) by a command from the terminal control unit 21, and is realized, for example, by a liquid crystal display (LCD) and the like. The terminal communication unit 25 functions as a transmission/reception unit for performing transmission/reception of various types of information with the server device 10 through the network 2, and is realized, for example, by a network interface card (NIC), and the like.

Data Structure

FIG. 4 is a diagram illustrating an example of a data structure of the card information stored in the data storage unit 12 of the server device 10. The card information includes items (fields) such as a card ID, a character name, a character image, rarity, initial attack power, initial defense power, and initial physical power. The card ID is identification information that identifies a game card as an example of the game content. The character name is information that indicates a display name of a character associated with a game card. In the present embodiment, the characters are named with respect to the type of character including a soldier-related character such as a "soldier A" and a "soldier B", and a witchcraft-related character such as a "wizard Z". To be specific, the soldier-related character is set to a game card in which the third digit of the card ID is "0". The witchcraft-related character is set to a game card in which the third digit of the card ID is "5". The character image is image data of a character. The rarity is a parameter that indicates the degree of rarity of a game card. In the present embodiment, four levels of rarity ("common"→"uncommon"→"rare"→"super rare") are set to game cards (characters). The initial attack power, initial defense power, initial physical power, and the like of a character are parameters that indicate ability values initially set to the character.

FIG. 5 is a diagram illustrating an example of a data structure of the player information stored in the data storage unit 12 of the server device 10. The player information includes items such as a player ID, a friend player ID, a player point, possessed card information, rental card information, deck information, and the like. The player ID is identification information that identifies the player. The friend player ID is information that indicates other players registered in a friend list of the player. The play point is information that indicates an amount of play point owned by the player, and is updated when the player consumes the play point, and the like. The possessed card information is information that indicates a game card possessed by the player (hereinafter, also referred to as a possessed card). The rental card information is information that indicates a game card temporarily owned by the player during rental of the game card (hereinafter, also referred to as rental card). The deck information is information related to a deck constructed by the player (a game card group composed of a plurality of game cards).

FIG. 6 is a diagram illustrating an example of a data structure of the possessed card information. The possessed card information includes items such as a possessed card ID, the level of a possessed card, attack power, defense power, an acquired date and time, and the like. The possessed card ID is identification information that identifies a possessed card. The level of a possessed card, the attack power, the defense power, and the like are parameters indicating ability values set to a character corresponding to a possessed card. These various parameters are updated according to a result of a battle game, and the like. The acquired date and time is information that indicates a date and time on which the player acquired a possessed card.

FIG. 7 is a diagram illustrating an example of a data structure of the rental card information. The rental card information includes items such as a rental card ID, the level of a rental card, attack power, defense power, a rental date and time, and the like. The rental card ID is identification information that identifies a rental card. The level of a rental card, the attack power, and the defense power are parameters indicating ability values set to a character corresponding to a rental card. These various parameters are updated in accordance with a result of a battle game and the like. The rental date and time is information that indicates a date and time on which the player rents a rental card. In the present embodiment, a high-rarity (for example, super rare), difficult-to-obtain game card can be set and rented as a rental card.

Figure 8:
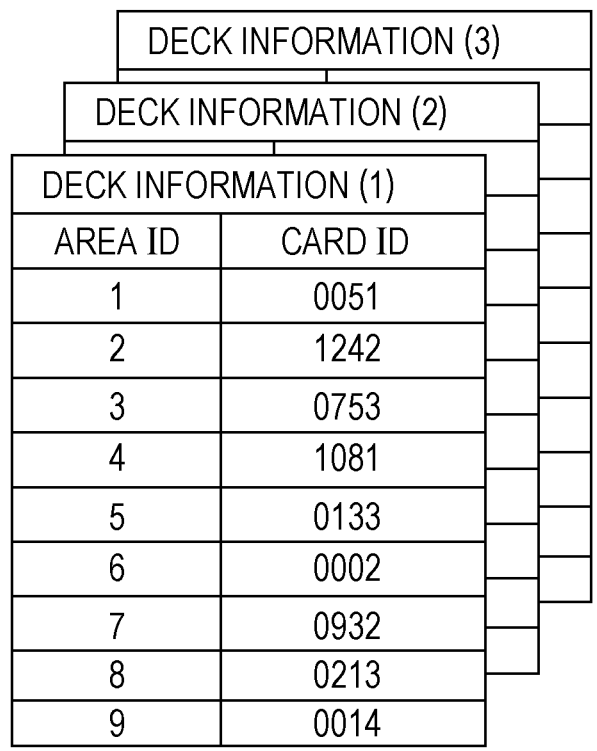
FIG. 8 is a diagram illustrating an example of a data structure of deck information.

FIG. 8 is a diagram illustrating an example of a data structure of the deck information. The deck information includes items of an area ID and a card ID. The area ID is identification information that identifies a unit area in which a character that constitutes a deck is arranged. The card ID is identification information that identifies a game card (character) arranged in a unit area of an associated area ID.

Outline of Game

Here, an outline of a game provided by the game system 1 of the present embodiment will be described. In the game system 1, a battle game performed using a game card (a virtual card used in a virtual space in the game) is provided.

Construction of Deck

In the game system 1 of the present embodiment, the player can possess a plurality of game cards associated with game characters. Before start of a battle game, the player can construct a deck (game card group) by combining game cards (characters) selected from the plurality of possessed game cards. The deck construction in the present embodiment is performed such that the player arranges characters corresponding to squares in the card arrangement area that is divided into a total of nine (3×3) squares (unit areas). Note that the deck construction can be performed by automatic arrangement of the plurality of characters on the squares without an operation by the player (recommended construction).

Battle Game

In the game system 1 of the present embodiment, a battle between a deck constructed by the player (game card group) and a deck of an opponent (game card group) is performed. To be specific, the control unit 11 of the server device 10 determines the game card group that is to be an opponent of the game card group constructed by the player, and determines an outcome of the battle game by these game card groups based on the various parameters (the attack power, the defense power, and the physical power) and the like set to the game cards that respectively constitute the game card groups. By repeatedly performing such a battle game, the various parameters set to the game cards that constitute the deck are varied, so that each game card can be enhanced and developed.

Rental of Rental Card

In the game system 1 of the present embodiment, an event game is performed, in which the player plays a battle against a special enemy character to go for acquisition of a special game card or item. This event game is a game conducted by participation of a plurality of players and is performed only during a limited period. Therefore, the players who participate in the event cooperate with each other to battle against the special enemy character, or compete with each other for the acquisition of a special game card. In this event game, a rental card set for rental is rented to the players. During the event game, the players can temporarily possess the rented rental card. Therefore, the players can use the rental card in a similar manner to their own possessed game cards. Therefore, the players can add the rental card to the deck composed of the own possessed game cards to reconstruct the deck, or can battle against the special enemy character using a deck made by combination of the own possessed game cards and the rental card. In this way, the players repeatedly perform a battle against a deck that is an opponent in a similar manner to the own possessed game cards to vary the various parameters set to the rental card, thereby enhancing and developing the rental card. Then, in this event game, when the event game is over, the player needs to return the temporarily possessed rental card.

Further, in the event game, when a game card having a predetermined relationship with the rental card is provided to the player, the parameter of the game card having the predetermined relationship is set based on the parameter of the rental card. For example, when a game card that is the same as the rental card is provided to the player in the event, the value of the parameter of the rental card is set as the value of the parameter of the same game card as it is. That is, by increasing the parameter of the rental card by repeatedly conducting a battle against the enemy character, the player can acquire a game card to which a high parameter is set in advance (a game card having an equivalent value to the enhanced and developed rental card). Accordingly, the player can be highly motivated to enhance and develop the rental card. Therefore, the player actively uses the rental card.

Providing Game Card

In the game system 1 of the present embodiment, when the player wins a battle game against the deck of the opponent (enemy character), or when a lottery game, so-called "Gacha Gacha (registered trademark)", is performed, a game card is provided to the player.

This lottery game is a game to provide the player with a game card selected from a plurality of game cards. In this lottery game, a regular lottery game and a special lottery game are performed. The regular lottery game is a game in which one game card is provided to the player at one lottery. The special lottery game is a game in which a plurality of game cards is provided to the player at one lottery. The player can selectively perform the regular lottery game and the special lottery game.

In this way, the player possesses the game card provided through the battle game, the lottery game, and the like (hereinafter, also referred to as provided card), thereby increasing the number of possessed game cards until reaching the upper limit. Further, the player can construct a deck using the own possessed game cards, and can play a battle game. In addition, the player can conduct fusion of the game cards described below using the own possessed game cards.

Fusion of Game Card

In the game system 1 of the present embodiment, the player can generate one game card by combining a plurality of game cards (applying fusion to the game cards to obtain one game card). By the fusion of the game cards, various parameters of a character corresponding to a game card after the fusion are varied (for example, the level, the attack power, the defense power, and the like).

In the present embodiment, the fusion of a game card is realized by combining a base card with at least one material card. By the fusion of the game cards, the values of the parameters such as the level, the attack power, and the defense power set to the base card before the fusion are increased, and the increased new parameters are set to the base card after the fusion. When the fusion of the game cards is performed in this way, the player does not possess the both of the base card and the material card, but possesses only the base card after the fusion.

Operation of Game System 1

In the game system according to the present embodiment, the control unit 11 in the server device 10 controls each function unit to be controlled according to programs stored in the data storage unit 12 to execute event participation processing, deck construction processing, battle game processing, lottery game processing, card fusion processing, and return condition determination processing. Hereinafter, each processing will be described.

Event Participation Processing

Figure 9:
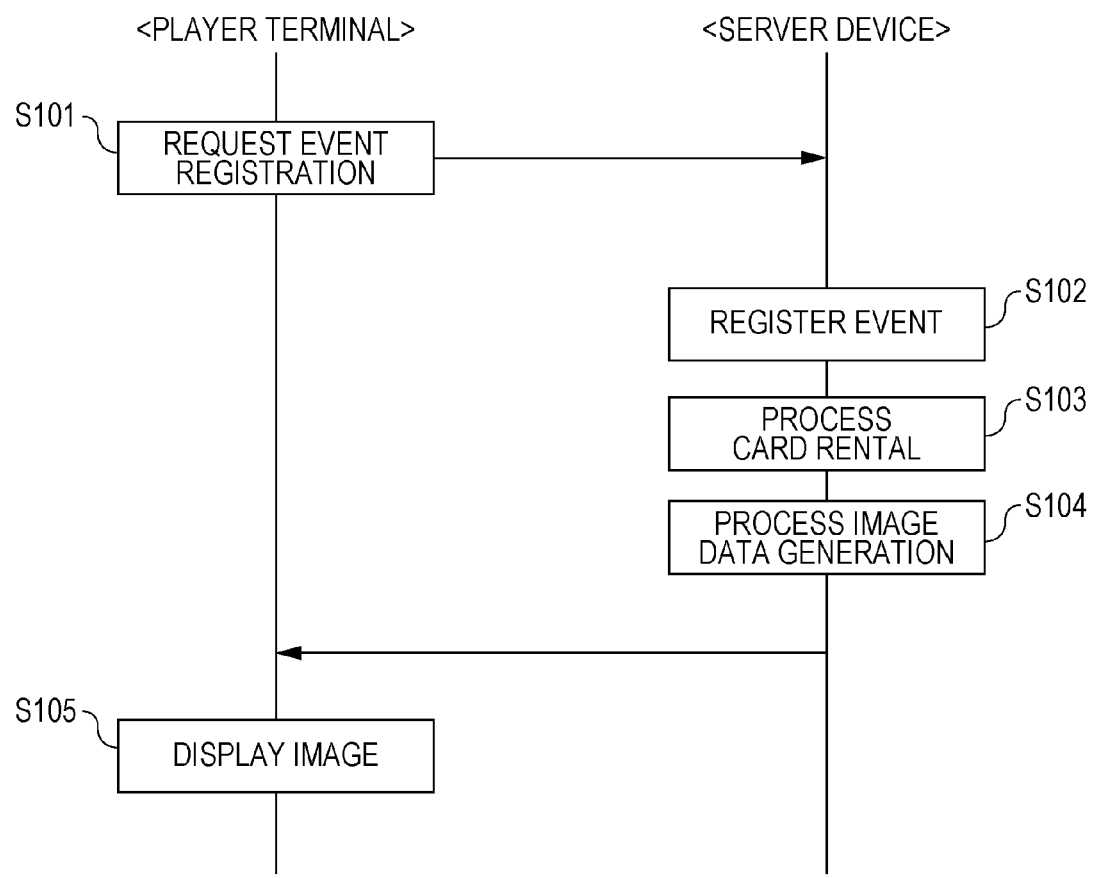
FIG. 9 is a flowchart for describing an example of an operation related to event participation of the game system.

FIG. 9 is a flowchart for describing an example of an operation related to event participation of the game system 1.

First, in the player terminal 20, upon receiving an operation input of start of event registration from the terminal input unit 23 operated by the player, the terminal control unit 21 transmits a command (event registration request) for starting event registration to the server device 10 through the terminal communication unit 25 (step S101).

Next, upon receiving the event registration request transmitted from the player terminal 20, the server device 10 registers a player ID in an event participant list in the data storage unit 12 (step S102).

Next, the server device 10 performs card providing processing for providing the player with a rental card (step S103). To be specific, the rental unit 111 selects a game card from a plurality of game cards set as rental cards by referring to the card information illustrated in FIG. 4, and provides the player with the selected game card. At this time, the recording unit 113 stores the rental card information in which the rental card is set as a game card to be temporarily possessed by the player (see FIG. 7) in the data storage unit 12.

Next, the server device 10 causes the image data generation unit 118 to generate image data for displaying a start page of an event game in the player terminal 20 (step S104). Then, the server device 10 transmits the image data generated by the image data generation unit 118 to the player terminal 20 that is a requestor through the communication unit 15.

Next, the player terminal 20 displays the start page of the game event in the terminal display unit 24 based on the image data transmitted from the server device 10 (step S105).

Figure 10:
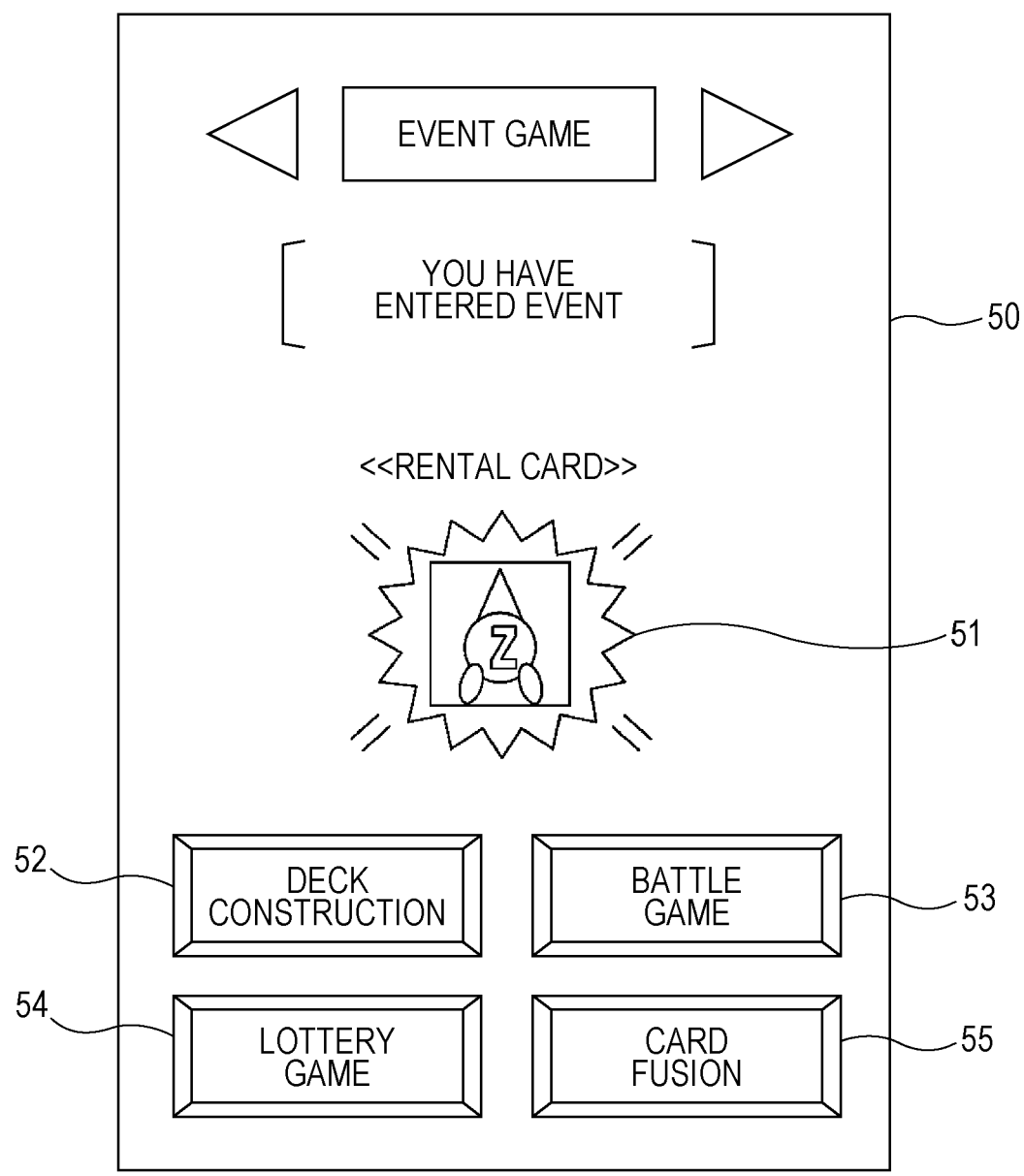
FIG. 10 is a diagram illustrating an example of a start page of an event game.

FIG. 10 is a diagram illustrating an example of the start page of the event game displayed in the terminal display unit 24. An event game screen 50 is a game screen for allowing the player to perform an operation input related to the event game. This event game screen 50 includes a rental card 51 rented to the player, a deck construction button 52, a battle game button 53, a lottery game button 54, and a card fusion button 55.

Deck Construction Processing

Figure 11:
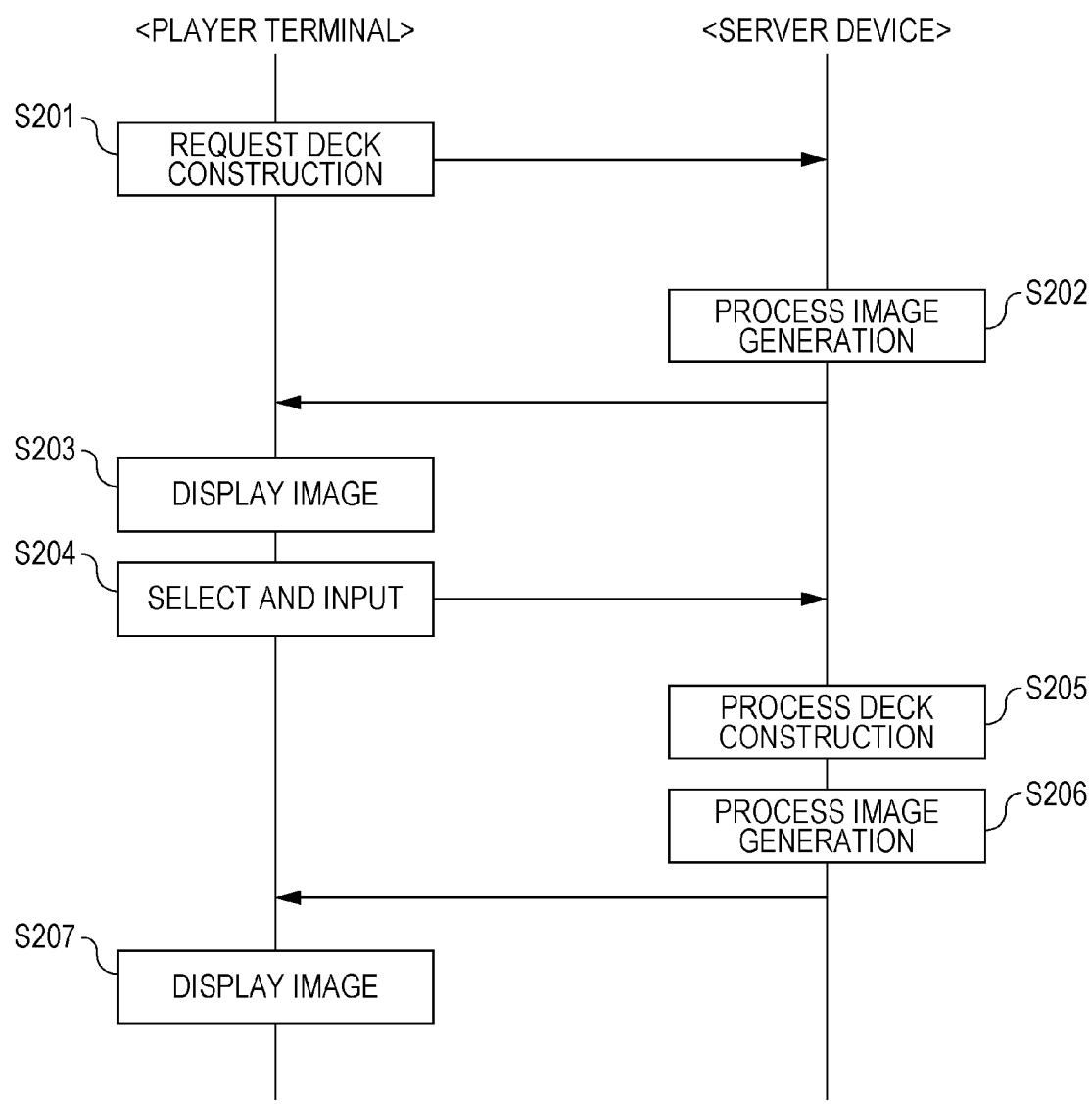
FIG. 11 is a flowchart for describing an example of an operation related to a deck construction of the game system.

FIG. 11 is a flowchart describing an example of an operation related to a deck construction in the game system 1.

First, when the deck construction button 52 is selected by the player while the event game screen 50 illustrated in FIG. 10 is being displayed in the terminal display unit 24, the player terminal 20 transmits a command (deck construction request) for starting a deck construction to the server device 10 through the terminal communication unit 25 (step S201).

Next, upon receiving the deck construction request transmitted from the player terminal 20, the server device 10 causes the image data generation unit 118 to generate image data for displaying a game screen for deck construction in the player terminal 20 (step S202). At this time, the image data generation unit 118 identifies the game cards that constitute the deck of the player by referring to the deck information illustrated in FIG. 8, and displays the game cards on the game screen for deck construction. Then, the server device 10 transits the image data generated by the image data generation unit 118 to the player terminal 20 that is a requestor through the communication unit 15.

Next, the player terminal 20 displays the game screen for deck construction in the terminal display unit 24 based on the image data transmitted from the server device 10 (step S203).

Figure 12:
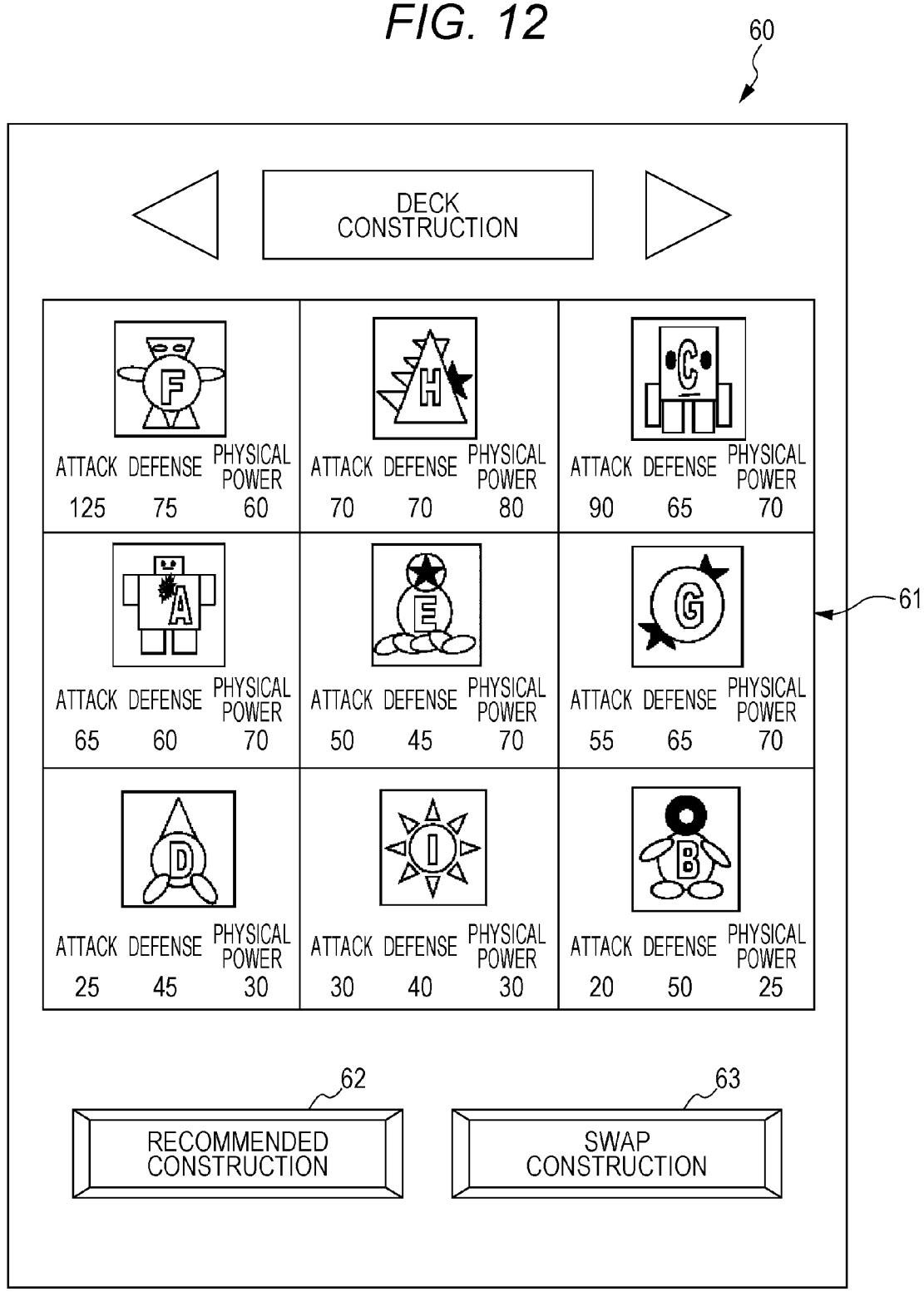
FIG. 12 is a diagram illustrating an example of a game screen when a deck construction is performed.

FIG. 12 is a diagram illustrating an example of the game screen for deck construction displayed in the terminal display unit 24. A game screen 60 for deck construction includes a card arrangement area 61, a recommended construction button 62, and a swap construction button 63. The card arrangement area 61 is configured from a total of nine (3×3) squares, and is an area in which the game cards that constitute the deck are arranged corresponding to the squares. The recommended construction button 62 is an operation button used for automatically arranging the cards on the squares. The swap construction button 63 is an operation button used for swapping and arranging game cards individually selected by the player. During the game screen 60 for deck construction being displayed in the terminal display unit 24, the player can perform a deck construction by arranging the rental card or the own possessed game cards on the squares.

Referring back to FIG. 11, when operation information related to the deck construction is selected and input by the player in this way, the operation information is transmitted from the player terminal 20 to the server device 10 (step S204).

Next, the server device 10 performs deck construction processing based on the operation information transmitted from the player terminal 20 (step S205). To be specific, when the recommended construction button 62 is selected by the player through the game screen 60 illustrated in FIG. 12, the control unit 11 refers to the possessed card information illustrated in FIG. 6 to automatically select a game card to constitute the deck from the game cards possessed by the player, and refers to the rental card information illustrated in FIG. 7 to automatically select a rental card to constitute the deck from the rental cards temporarily possessed by the player. At this time, the control unit 11 constructs the deck such that the control unit 11 sequentially selects a game card and a rental card having a high attack power parameter value, and arranges the cards on the card arrangement area 61. Note that, in the present embodiment, a game card having high rarity (for example, super rare) is rented as a rental card, and therefore, the rental card is preferentially selected. Meanwhile, when the swap construction button 63 is selected by the player through the game screen 60 illustrated in FIG. 12, the control unit 11 refers to the possessed card information illustrated in FIG. 6, and selects a game card to constitute the deck from the game cards possessed by the player according to an operation input by the player, and refers to the rental card information illustrated in FIG. 7 and selects a rental card that constitutes the deck from the rental cards temporarily possessed by the player according to an operation input by the player. In this way, when the deck is constructed by the selection of the game cards and the rental cards, the recording unit 113 records the deck information of the player (refer to FIG. 8) in the data storage unit 12.

Next, when the deck is constructed by the deck construction processing, the server device 10 transmits image data generated by the image data generation unit 118 to the player terminal 20 that is a requestor through the communication unit 15 (step S206).

Next, the player terminal 20 displays a game screen after the deck construction in the terminal display unit 24 based on the image data transmitted from the server device 10 (step S207).

Figure 13:
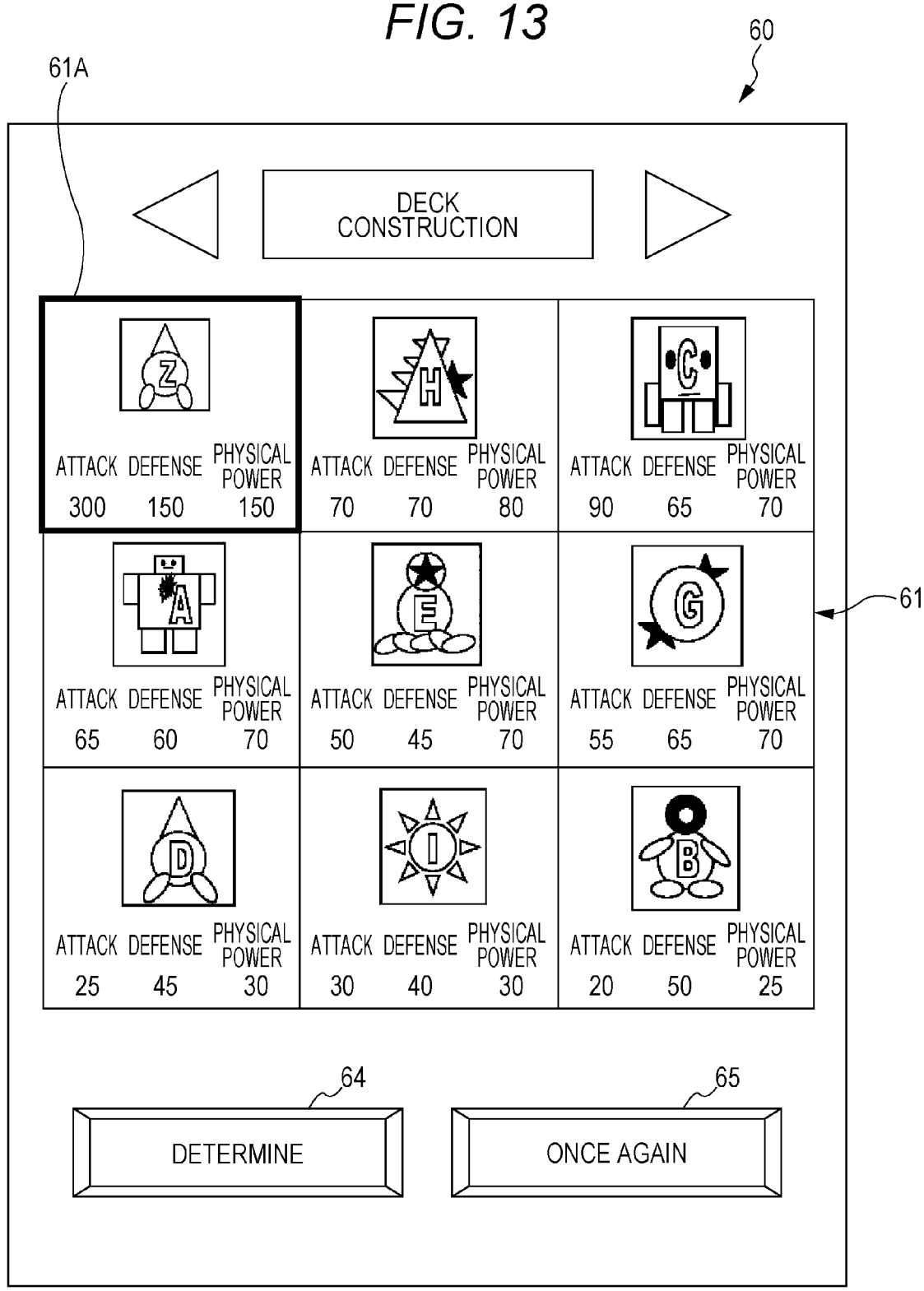
FIG. 13 is a diagram illustrating an example of a game screen after the deck construction.

FIG. 13 is a diagram illustrating an example of the game screen after the deck construction displayed in the terminal display unit 24. The game screen 60 after the deck construction includes the card arrangement area 61 on which the deck after construction is arranged, a determination button 64 for confirming the deck after the construction, and a once-again button 65 for performing a deck construction again. Here, as illustrated in FIG. 13, the game cards that constitute the deck after the construction include a rental card 61A.

Battle Game Processing

Figure 14:
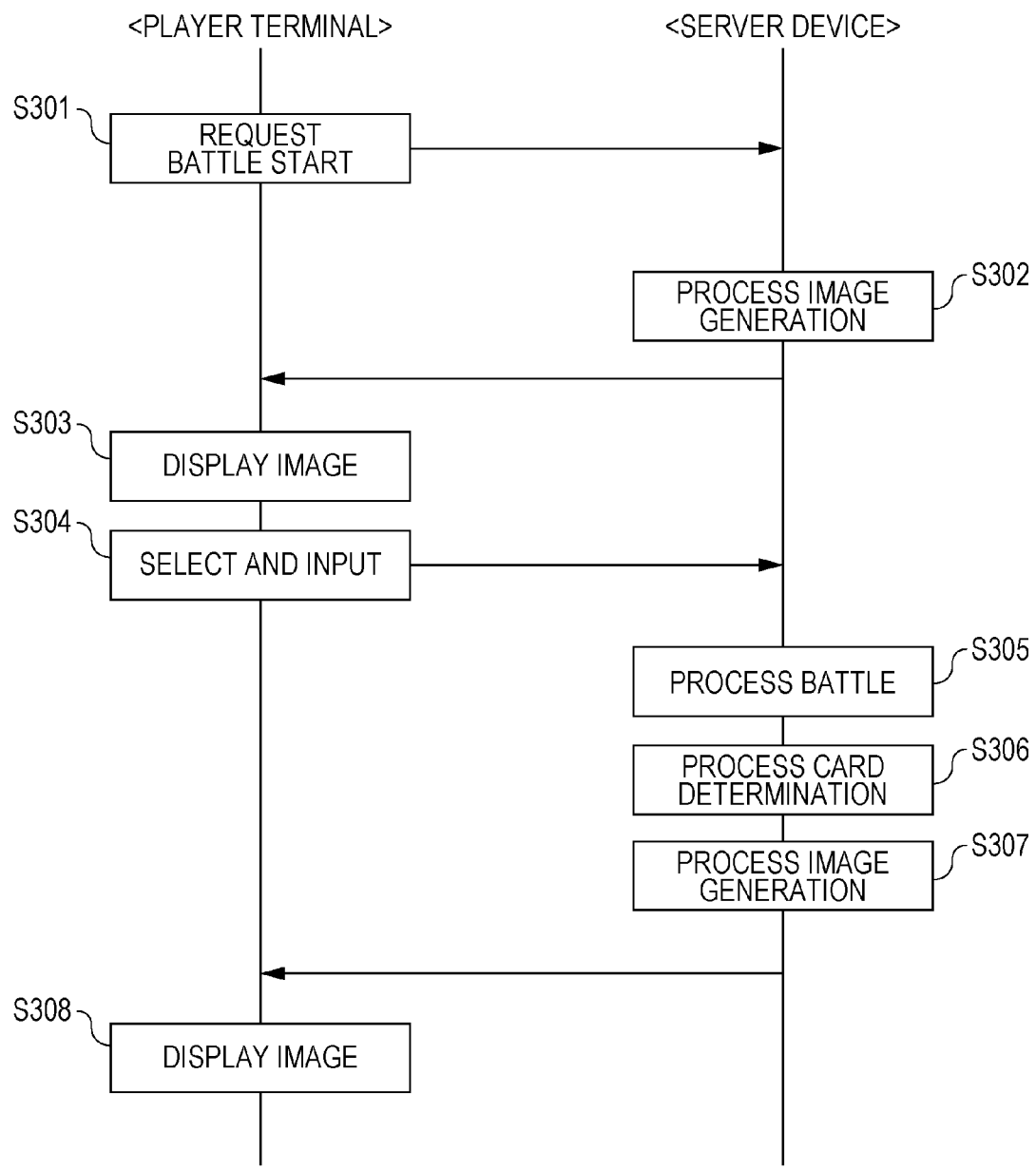
FIG. 14 is a flowchart for describing an example of an operation related to a battle of the game system.

FIG. 14 is a flowchart for describing an example of an operation related to a battle in the game system 1.

First, when the battle game button 53 is selected by the player while the event game screen 50 illustrated in FIG. 10 is being displayed in the terminal display unit 24, the player terminal 20 transmits a command for starting a battle game (battle start request) to the server device 10 through the terminal communication unit 25 (step S301).

Next, upon receiving the battle start request transmitted from the player terminal 20, the server device 10 transmits image data generated by the image data generation unit 118 to the player terminal 20 that is a requestor through the communication unit 15 (step S302).

Next, the player terminal 20 displays a game screen for battle in the terminal display unit 24 based on the image data transmitted from the server device 10 (step S303).

Figure 15:
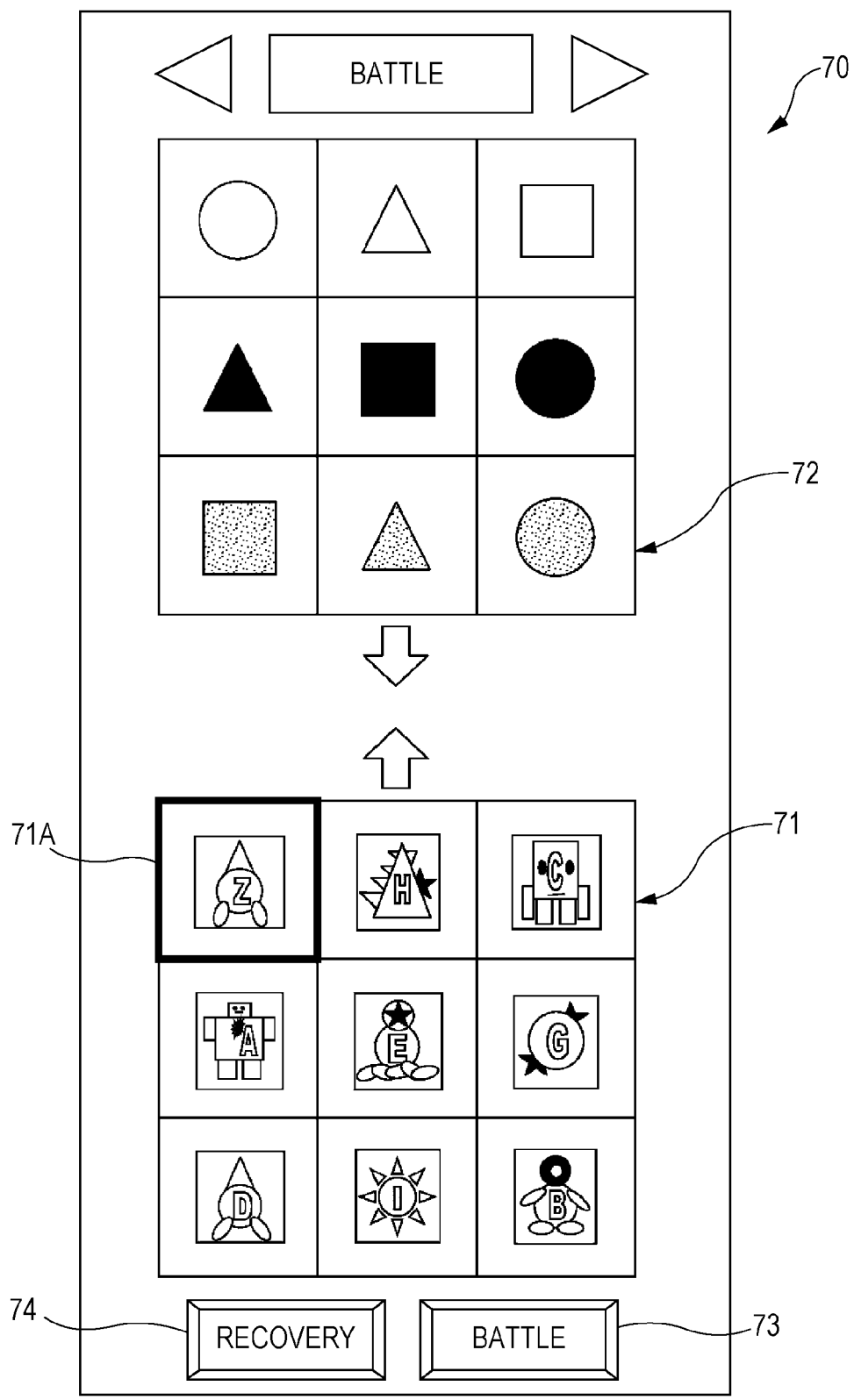
FIG. 15 is a diagram illustrating an example of a game screen when a battle is performed.

FIG. 15 is a diagram illustrating an example of the game screen for battle displayed in the terminal display unit 24. A game screen 70 for battle includes a card arrangement area 71 on which the game cards that constitute the deck of the player are arranged, an enemy character arrangement area 72 on which enemy characters that constitute a deck of the opponent are arranged, a battle button 73 for starting a battle, and a recovery button 74 for recovering the physical parameters of the game cards that constitute the deck. Here, the game cards that constitute the deck of the player include a rental card 71A as illustrated in FIG. 15.

Referring back to FIG. 14, when the operation information related to the battle is selected and input by the player, the operation information is transmitted from the player terminal 20 to the server device 10 (step S304).

Next, the server device 10 performs battle processing based on the operation information received from the player terminal 20 (step S305). To be specific, when the battle button 73 is selected by the player through the game screen 70 illustrated in FIG. 14, the control unit 11 determines battle details and an outcome result based on the various parameters set to the game cards (also including the rental card 71A) that constitute the deck of the player by referring to the possessed card information illustrated in FIG. 6, the rental card information illustrated in FIG. 7, and the deck information illustrated in FIG. 8. Then, the parameter varying unit 115 varies the various parameters set to the card games (also including the rental card 71A) that constitute the deck of the player in accordance with the battle details and the outcome result. For example, the level of the rental card 71A that constitutes the deck is increased. With the variation of parameters of the game cards and the rental card, the update unit 117 updates the possessed card information stored in the data storage unit 12 (see FIG. 6) and the rental card information (see FIG. 7). Note that, in varying the various parameters of the game cards and the rental card, the rate of variability of the rental card may be caused to be larger than the rate of variability of the game cards. Accordingly, the enhancement and development of the rental card becomes easier, and therefore, the player more actively uses the rental card. Meanwhile, when the recovery button 74 is pressed through the game screen 70 illustrated in FIG. 14, the control unit 11 performs processing of recovering the physical parameters of the characters that constitute the deck.

In addition, in the battle processing, the providing unit 112 provides the player with a game card based on the battle details and the outcome result. The providing unit 112 refers to the card information illustrated in FIG. 4 and provides the player with a game card selected from a plurality of game cards. When the game card is provided by the providing unit 112, the recording unit 113 stores the possessed card information (see FIG. 6) in which the provided game card is set as a game card to be possessed by the player in the data storage unit 12.

Here, when the providing unit 112 provides the player with the game card, the server device 10 performs the card determination processing of determining whether the provided game card and the rented rental card have a predetermined relationship (step S306). To be specific, the determination unit 114 determines whether the card IDs of the provided game card and the rented rental card are matched. Then, when the determination unit 114 determines that the card IDs are matched, both cards are the same card, and thus the parameter setting unit 116 sets a parameter of the provided game card based on the parameter of the rental card after being enhanced and developed. In the present embodiment, the parameter of the rental card is copied as it is, and the copied parameter is set as the parameter of the provided game card. Meanwhile, when the determination unit 114 determines that the card IDs are not matched, the both cards are different cards, and thus the parameter setting unit 116 sets the parameter of the provided game card to an initial value. When the parameter of the provided game card is set in this way, the update unit 117 updates the possessed card information (see FIG. 6) stored in the data storage unit 12.

From this, the enhanced and developed rental card can be caused to an own possessed game card in a practical way without returning the rental card, and therefore, the motivation to actively use the rental card can be enhanced.

Next, when the battle details and the outcome result is determined by the execution of the battle processing, the server device 10 transmits image data generated by the image data generation unit 118 to the player terminal 20 that is a requestor through the communication unit 15 (step S307).

Figure 16:
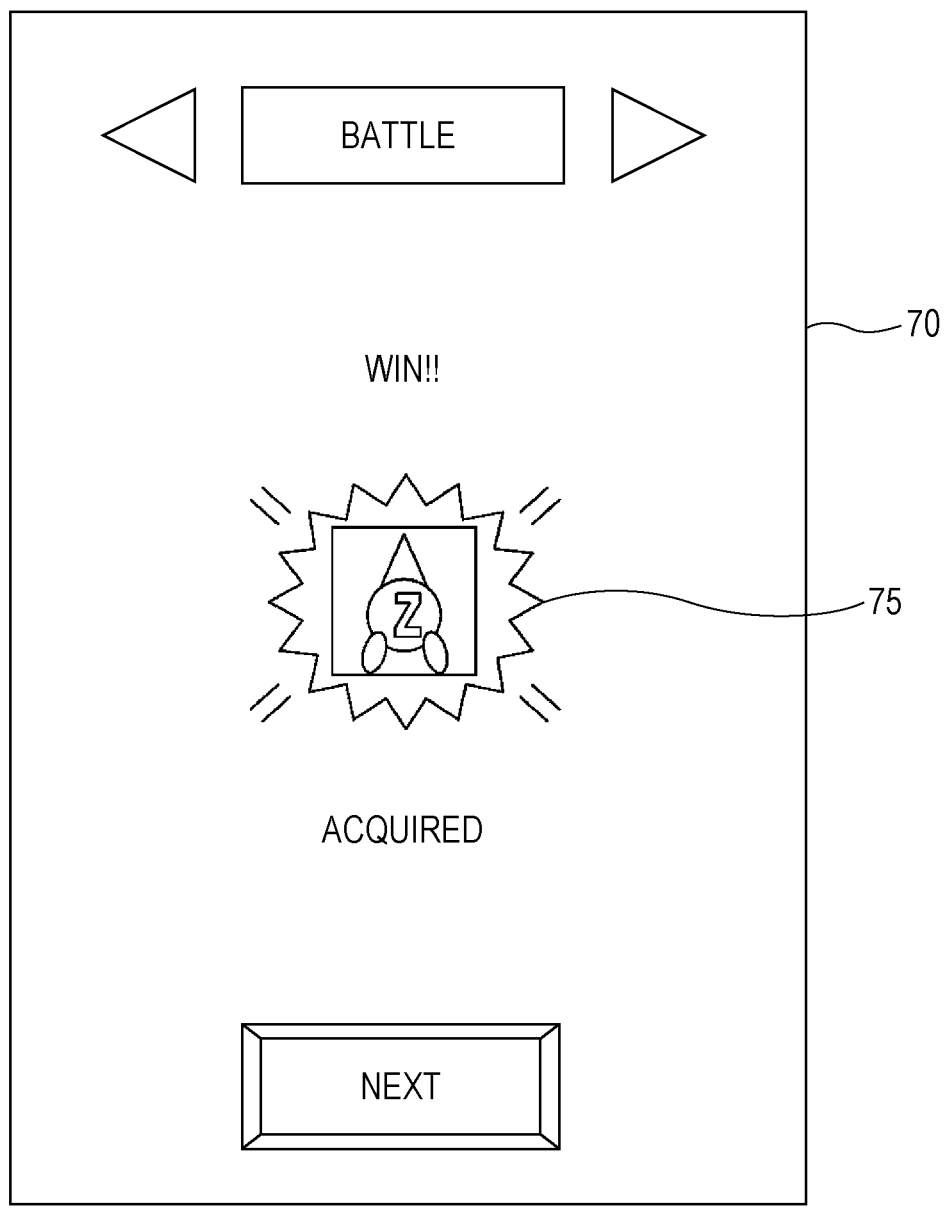
FIG. 16 is a diagram illustrating an example of the game screen after the battle.

Next, the player terminal 20 displays the game screen 70 in the terminal display unit 24 as illustrated in FIG. 16 based on the image data transmitted from the server device 10 (step S308). The player can confirm the outcome and the provided game card 75 by looking at the game screen 70 displayed in the terminal display unit 24. Note that the provided game card 75 is the same game card as the rented rental card 51 (see FIG. 10) as illustrated in FIG. 16.

Lottery Game Processing

Figure 17:
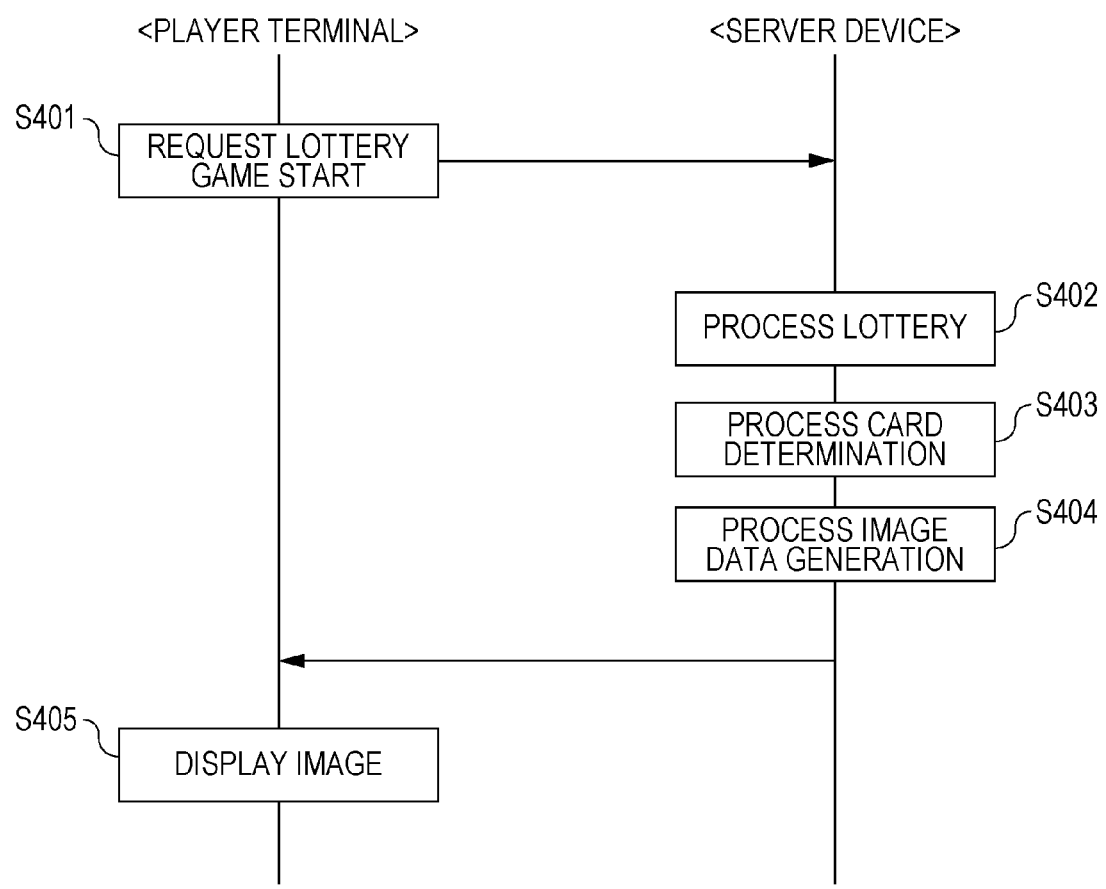
FIG. 17 is a flowchart for describing an example of an operation related to a lottery game of the game system.

FIG. 17 is a flowchart for describing an example of an operation related to a lottery game of the game system 1.

First, when the lottery game button 54 is selected by the player while the event game screen 50 illustrated in FIG. 10 is being displayed in the terminal display unit 24, the player terminal 20 transmits a command (lottery game start request) for starting a lottery game to the server device 10 through the terminal communication unit 25 (step S401).

Next, upon receiving the lottery game start request transmitted from the player terminal 20, the server device 10 executes lottery processing (step S402). To be specific, the providing unit 112 refers to the card information illustrated in FIG. 4, and provides the player with a game card selected from the plurality of game cards with a random number. The providing unit 112 provides one game card at one lottery in a regular lottery game, and provides 10 game cards at one lottery in a special lottery game.

Here, the server device 10 performs card determination processing of determining whether the provided game card and the rented rental card have a predetermined relationship when the providing unit 112 provides the player with the game card (step S403). Specific processing details are similar to the card determination processing illustrated in step S306 of FIG. 14.

Next, when the game card is provided to the player by the lottery processing in this way, the server device 10 transmits image data generated by the image data generation unit 118 to the player terminal 20 that is a requestor through the communication unit 15 (step S404).

Next, the player terminal 20 displays a game screen that shows a lottery result in the terminal display unit 24 based on the image data transmitted from the server device 10 (step S405).

Card Fusion Processing

Figure 18:
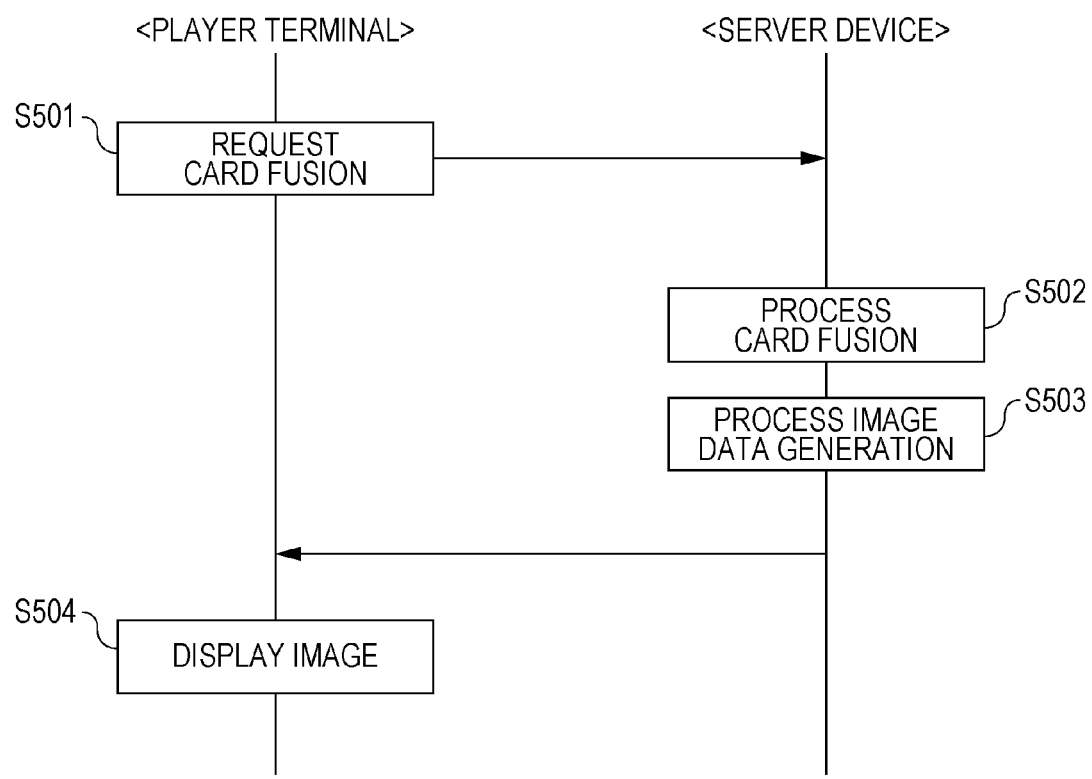
FIG. 18 is a flowchart for describing an example of an operation related to card fusion of the game system.

FIG. 18 is a flowchart for describing an example of an operation related to card fusion of the game system 1.

First, when the card fusion button 55 is selected by the player while the event game screen 50 illustrated in FIG. 10 is being displayed in the terminal display unit 24, the player terminal 20 transmits a command (card fusion request) for starting card fusion to the server device 10 through the terminal communication unit 25 (step S501).

Next, upon receiving the card fusion request transmitted from the player terminal 20, the server device 10 executes card fusion processing (step S502). To be specific, first, the determination unit 114 determines whether the player points possessed by the player is predetermined points or more by referring to the player information (see FIG. 5) recorded in the data storage unit 12. When the player points are the predetermined points or more, the determination unit 114 consumes the player points possessed by the player by the predetermined points. Next, the control unit 11 refers to the possessed card information illustrated in FIG. 6, selects a base card and a material card from the plurality of the game cards possessed by the player, and combines the material card with the base card. Then, when the material card is combined with the base card in this way, the parameter varying unit 115 refers to the possessed card information illustrated in FIG. 6, acquires the level of the base card and the ability parameters such as the attack power and the defense power, and changes the ability parameters to new ability parameters by increasing the values of the acquired ability parameters. The parameter setting unit 116 then sets the base card having the increased new ability parameters as a base card after the fusion. Note that, when the rental card is selected as a base card in card fusion, the parameter varying unit 115 may control the rate of variability when the rented rental card is selected as a base card to be larger than the rate of variability when the provided game card is selected as a base card. Accordingly, the enhancement and development of the rental card can be easier, and therefore, the player actively uses the rental card. Next, when the card fusion has been done in this way, the material card is not recorded in the data storage unit 12 as the possessed card of the player, but the base card after the fusion is recorded in the data storage unit 12 as the possessed card by the player. That is, the recording unit 113 updates and records the possessed card information illustrated in FIG. 6, and resets the base card after the fusion as the possessed card by the player.

Referring back to FIG. 18, when the game cards are subjected to the fusion by the card fusion processing, the server device 10 transmits image data generated by the image data generation unit 118 to the player terminal 20 that is requestor through the communication unit 15 (step S503).

Next, the player terminal 20 displays the game screen that shows a result of the card fusion in the terminal display unit 24 based on the image data transmitted from the server device 10 (step S504).

Return Condition Determination Processing

Figure 19:
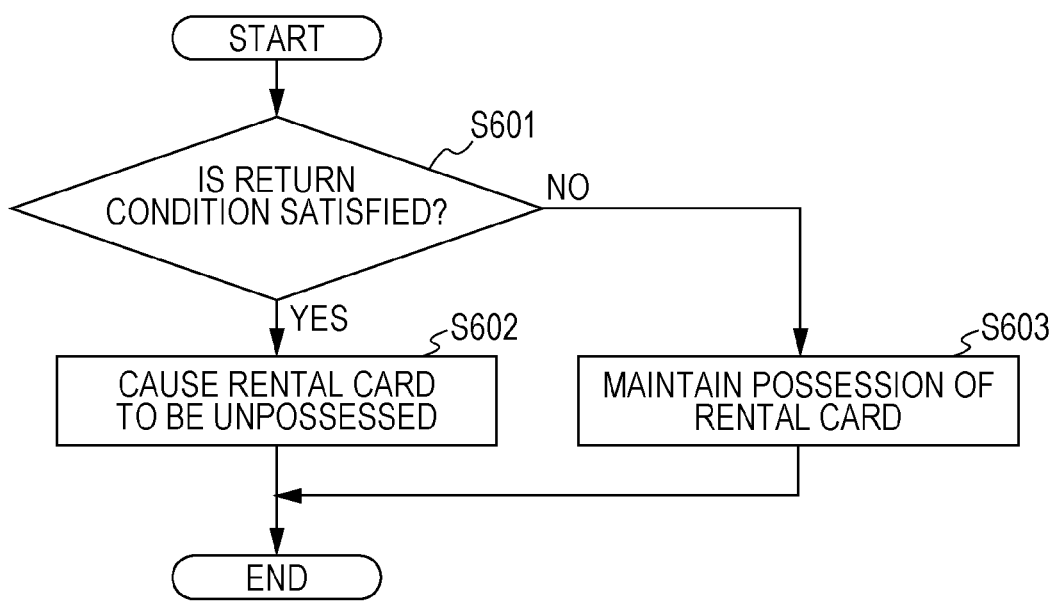
FIG. 19 is a flowchart for describing return condition determination processing.

FIG. 19 is a flowchart for describing return condition determination processing in the game system 1. The server device 10 executes the return condition determination processing of determining whether a return condition for returning a rental card is satisfied, at a predetermined timing during an event game.

First, the server device 10 determines whether the return condition of the rental card is satisfied (step S601). In the present embodiment, completion of an event game (an event period has elapsed) is the return condition. That is, the determination unit 114 determines whether a predetermined period has elapsed from the start of an event by counting time with a timer built in the control unit 11.

Next, when the determination unit 114 determines that the return condition is satisfied, the server device 10 performs processing of returning the rental card temporarily possessed by the player (step S602). That is, the update unit 117 updates the rental card information (see FIG. 7) stored in the data storage unit 12 so that the rental card becomes a game card not possessed by the player.

Meanwhile, the determination unit 114 determines that the return condition is not satisfied, the server device 10 does not return the rental card and allows the player to continuously possess the rental card (step S603).

As described above, according to the game system 1 of the present embodiment, when the rental card rented from the rental unit 111 and the game card provided by the providing unit 112 have a predetermined relationship, the rental card enhanced and developed by the player can be caused to be a possessed game card in a practical way without returning the rental card. Therefore, the player is motivated to actively use the rental card.

Other Embodiments

The above-described embodiments have been given for easy understanding of the present invention, and are not used to construe the present invention in a limited manner. The present invention can be changed and improved without departing from the gist of the invention and includes its equivalents. Especially, embodiments described below are also included in the present invention.

Card Determination Processing

In the above present embodiment, an example has been described, in which, in determining whether the provided game card and the rented rental card have a predetermined relationship in the card determination processing, whether the both cards are the same game card is determined. However, the present invention is not limited to the example. For example, as the predetermined relationship, whether the both cards are similar type game cards may be determined. To be specific, the determination unit 114 refers to the card information illustrated in FIG. 4 and determines whether the third digits of the both card IDs are matched (for example, the game card in which the third digit of the card ID is "0" is a soldier-related character).

Further, in the above present embodiment, an example has been described, in which, when the determination unit 114 determines the provided game card and the rented rental card have a predetermined relationship, the parameter setting unit 116 copies the parameter of the rental card as it is, and set it as a parameter of the provided game card, in setting the parameter of the provided game card based on the parameter of the rental card. However, the present invention is not limited to the example. For example, when the level of the enhanced and developed rental card is "50", the parameter setting unit 116 may set the level of the provided game card to "50" by copying the level from the rental card, or may set the value to a value obtained by multiplying a predetermined coefficient to "50" or a value obtained by adding (subtracting) a predetermined number to/from "50". Accordingly, the player can omit work to enhance and develop the level of the provided game card.

Card Fusion Processing

In the above present embodiment, when returning of the rental card temporarily possessed by the player is determined by a determination result of the return condition determination processing, the rental card may be used as a material card and subjected to fusion with the base card possessed by the player. The base card in this case may be a game card automatically selected from the plurality of game cards possessed by the player without an operation by the player, or may be a game card designated by the player from the plurality of game cards possessed by the player. At this time, the parameter varying unit 115 varies a parameter to be set to the base card after the fusion based on the parameter of the rental card.

Note that, in using the rental card as a material card and applying fusion to the material card and the base card, when the game card having a predetermined relationship with the rental card is used as the base card, the parameter varying unit 115 may control the rate of variability of the parameter set to the base card after the fusion to be larger than the rate of variability of the base card not having the predetermined relationship with the rental card. The predetermined relationship is, for example, the fact that the both cards are the same game card, the both cards are similar type game cards, or the like. From this, the player is motivated to enhance and develop the rental card, and thus the player more actively uses the rental card. Note that the timing of using the rental card as a material card and applying fusion to the material card and the base card is not limited to the timing of returning the rental card, as described above. For example, any timing can be employed as long as it is during the event game. That is, since the rental card is used as a material card and subjected to fusion in the end, the timing of fusion may be determined by the player.

Return Condition Determination Processing

In the above present embodiment, an example has been described, in which completion of an event game is the return condition of a rental card in the return condition determination processing. However, the present invention is not limited to the example. For example, an elapse of a predetermined period from the rental of a rental card (for example, three days from the date of rental), an improvement of the level (for example, the fact that the level has reached the level 50), a progress status of the game (for example, the fact that the player have entered the third stage), mission clear, the number of use of a rental card (the number of attacks on enemy, the number of defenses from the enemy), and the like may be the return condition. Other than the above, for example, the fact that the providing unit 112 has provided the player with a certain game card that has a predetermined relationship with a rented rental card may be combined with other return conditions. To be specific, not only the return condition by the completion of an event game, but also the fact that the providing unit 112 has provided the player with a game card that is the same as a rented rental card, or the fact that the providing unit 112 has provided the player with a game card that is a similar type with the rented rental card may be the return condition. Accordingly, the player does not need to temporarily possess a rental card, but may just only possess a game card having a predetermined relationship with the rental card.

Rental of Rental Card

In the above present embodiment, an example has been described, in which the player is provided with a rental card by participating in an event game. However, the present invention is not limited to the example. For example, a rental card may be rented as a bonus for the number of logging-in, a bonus for the fact that the player invites a friend, or a bonus for a win of a battle game. Other than the above, a rental card may be rented when a certain game condition occurs, where the condition provides the player with an incentive.

Server Device

In the above-described present embodiments, the game system 1 provided with one server device 10 as an example of a server device has been exemplarily described. However, the game system 1 is not limited to this example, and may be provided with a plurality of server devices 10 as an example of the server device. That is, a plurality of server devices 10 is connected through a network 2, and each of the server devices 10 may perform various types of processing in a distributed manner. Note that the information processing apparatus is an example of a computer.

Information Processing Apparatus

In the above-described game system 1 in the present embodiments, a case has been exemplarily described, in which various types of processing are executed based on a game program by the server device 10 and the player terminal 20 in cooperation with each other. However, the game system 1 is not limited to the example. The above-described various types of processing may be executed by the player terminal 20 alone or by the server device 10 alone as an information processing apparatus based on the game program.

Further, it may be configured such that the player terminal 20 bares a part of the functions as the information processing apparatus. In this case, the server device 10 and the player terminal 20 constitute the information processing apparatus.

What is claimed is:

1. An information processing apparatus comprising:
a processor, configured to:
associate rental game content rented to a player and game content provided to the player, with the player to store;
vary at least a parameter set to the rental game content, based on an operation input from the player;
determine, when the game content is provided to the player during the rental game content being rented, whether the game content and the rental game content have a predetermined relationship; and
set a parameter of the game content based on the varied parameter set to the rental game content when it is determined that there is the predetermined relationship.

2. The information processing apparatus according to claim 1, wherein the processor varies not only the parameter set to the rental game content but also the parameter set to the game content provided to the player, based on the operation input from the player and significantly varies the parameter set to the rental game content compared with the parameter set to the game content when varying the parameter set to the rental game content.

3. A non-transitory computer-readable storage medium storing a game program for causing a computer to execute the processing of:
storing, in a storage unit, rental game content rented to a player and game content provide to the player in association with the player;
varying at least a parameter set to the rental game content based on an operation input from the player;
when game content is provided to the player during the rental game content being rented, determining whether the game content and the rental game content have a predetermined relationship; and
setting a parameter of the game content based on the varied parameter set to the rental game content when it has been determined that there is the predetermined relationship.

* * * * *